United States Patent
Knuppel

[19]

[11] Patent Number: 5,930,944
[45] Date of Patent: Aug. 3, 1999

[54] APPARATUS AND METHOD FOR TRAPPING AND MONITORING MICE AND INSECTS

[75] Inventor: Harry E. Knuppel, Albia, Iowa

[73] Assignee: Kness Mfg. Co., Inc., Albia, Iowa

[21] Appl. No.: 08/802,016

[22] Filed: Feb. 18, 1997

[51] Int. Cl.⁶ .............................. A01M 1/00; A01M 1/14
[52] U.S. Cl. .................................. 43/114; 43/58; 43/121
[58] Field of Search ................................. 43/58, 114, 121

[56] References Cited

U.S. PATENT DOCUMENTS

| | | | |
|---|---|---|---|
| 2,962,836 | 12/1960 | Hughes | 43/58 |
| 3,913,259 | 10/1975 | Nishimura | 43/114 |
| 3,940,874 | 3/1976 | Katsuda | 43/114 |
| 4,161,079 | 7/1979 | Hill | 43/58 |
| 4,244,134 | 1/1981 | Otterson | 43/58 |
| 4,395,842 | 8/1983 | Marguilies | 43/114 |
| 4,694,604 | 9/1987 | Mitchell | 43/114 |
| 4,709,503 | 12/1987 | McQueen | 43/114 |
| 4,709,504 | 12/1987 | Andric | 43/114 |
| 5,148,625 | 9/1992 | Saleman | 43/121 |
| 5,303,501 | 4/1994 | Seeman | 43/114 |
| 5,398,442 | 3/1995 | Musket | 43/114 |
| 5,438,792 | 8/1995 | Monett | 43/114 |
| 5,572,825 | 11/1996 | Gehret | 43/114 |
| 5,673,509 | 10/1997 | Gatewood | 43/58 |

*Primary Examiner*—Kurt Rowan
*Attorney, Agent, or Firm*—Zarley, McKee, Thomte, Voorhees & Sease

[57] ABSTRACT

A combined mouse and insect trap is formed from a container having side walls, a bottom wall, and a top wall forming an enclosed compartment. A glue board is placed within the compartment and is capable of gripping and holding a mouse or an insect whenever a mouse or insect contact it. One or more mouse holes are provided in the side walls to permit mice to enter the compartment. Also one or more insect holes are provided in the side walls. The insect holes are too small to permit a mouse to enter, but are small enough to permit insects to enter the compartment.

4 Claims, 4 Drawing Sheets

5,930,944

APPARATUS AND METHOD FOR TRAPPING AND MONITORING MICE AND INSECTS

BACKGROUND OF THE INVENTION

The present invention relates to a method and apparatus for trapping and monitoring mice and insects.

FIG. 4 illustrates a prior art apparatus for trapping mice. This apparatus is designated generally by the numeral 60 and includes an enclosed box or container 62 having a bottom wall 64, and side walls 66. The side walls 66 include one or more mouse holes 68 and a lid or top 70 which frictionally slides over the top of the box and encloses it. Within the box is a V-shaped deflector 72 comprised of first and second V walls 74, 76. A glue board 78 is positioned on the bottom wall 64 within the box 60 and includes a very tacky upper surface which when encountered by mice grips them and holds them against further movement.

Prior art devices such as device 60 have been constructed of metal, and include a lid 70 which is opaque. Because of the opaque lid it is not possible to ascertain whether or not the apparatus has entrapped any mice without first removing the lid.

Apparatus 60 is often used in areas where insects also are present. Examples may be warehouses, grain storage areas, factories, offices, or homes. One recent concept for insect control involves the step of monitoring the particular types of insects which are present in any given location. After ascertaining the type of insect present, it is then possible to formulate a treatment process for eliminating that particular type of insect. This process eliminates the use of unnecessary insecticides or other treatment measures which are not specifically adapted for the type of insect present.

Therefore, a primary object of the present invention is the provision of an improved apparatus and method for trapping and monitoring mice and insects.

A further object of the present invention is the provision of an apparatus and method which enables the user to see the contents of the apparatus without removing the lid.

A further object of the present invention is the provision of an apparatus and method for trapping and monitoring mice and insects which permits both mice and insects to enter the apparatus and become trapped therein.

A further object of the present invention is the provision of an improved apparatus and method for trapping and monitoring mice and insects which permits the monitoring of the type of insects present, the trapping of mice, and also the provision of an enclosed bait for eliminating insects.

A further object of the present invention is the provision of an improved apparatus and method for trapping and monitoring mice and insects which is constructed of plastic and therefore has reduced manufacturing cost.

A further object of the present invention is the provision of an apparatus and method for trapping and monitoring mice and insects which is economical to manufacture, durable in use, and efficient in operation.

SUMMARY OF THE INVENTION

A combined mouse and insect trap comprises a container having side walls, a bottom wall, and a top wall forming an enclosed compartment. A tacky substance covers at least a portion of the bottom wall within the compartment. The tacky substance has the property of being able to grip and hold a mouse or an insect whenever the mouse or insect come into contact with the tacky substance.

One or more mouse holes are provided in the side walls of the container. The mouse holes are sized to permit a mouse to enter through them into the compartment. In addition to the mouse holes, there are one or more insect holes in the side walls. The insect holes are sized too small to permit a mouse to enter, but they are sized to permit insects to enter the compartment. An attractant material is within the compartment capable of attracting mice or insects by sense of smell.

One feature of the invention is a top wall which is transparent to permit viewing the contents of the compartment from outside the compartment.

Another feature of the invention is the provision of one or more diverter panels within the compartment adjacent the mouse holes for diverting a mouse entering the compartment through one of the mouse holes toward the tacky substance. The diverter panels divide the compartment into two sub compartments. The mouse holes communicate with one of the sub compartments, and the insects holes communicate with both of the sub compartments.

An insect bait may be stored within one of the two sub compartments, and one or more pheromone mounting holes may be provided in the side walls of the container. A pellet of pheromone material is mounted within each of the pheromone mounting holes and is exposed to the interior of the compartment. As used in this application the term "pheromone" refers to an attractant which draws insects and/or mice to the interior of the compartments. The attractant usually attracts animals or insects by their sense of smell, but attractants which appeal to the other senses are also included in the term pheromone as used herein.

The tacky substance referred to in the present application refers generally to any of a plurality of glues or adhesives presently used in glue boards or glue traps commercially available. The glue boards or glue traps include a paper board backing material having a highly tacky adhesive material on its upper surface. When the mice or insects contact the adhesive material they stick to it and are unable to free themselves.

Figure 1:
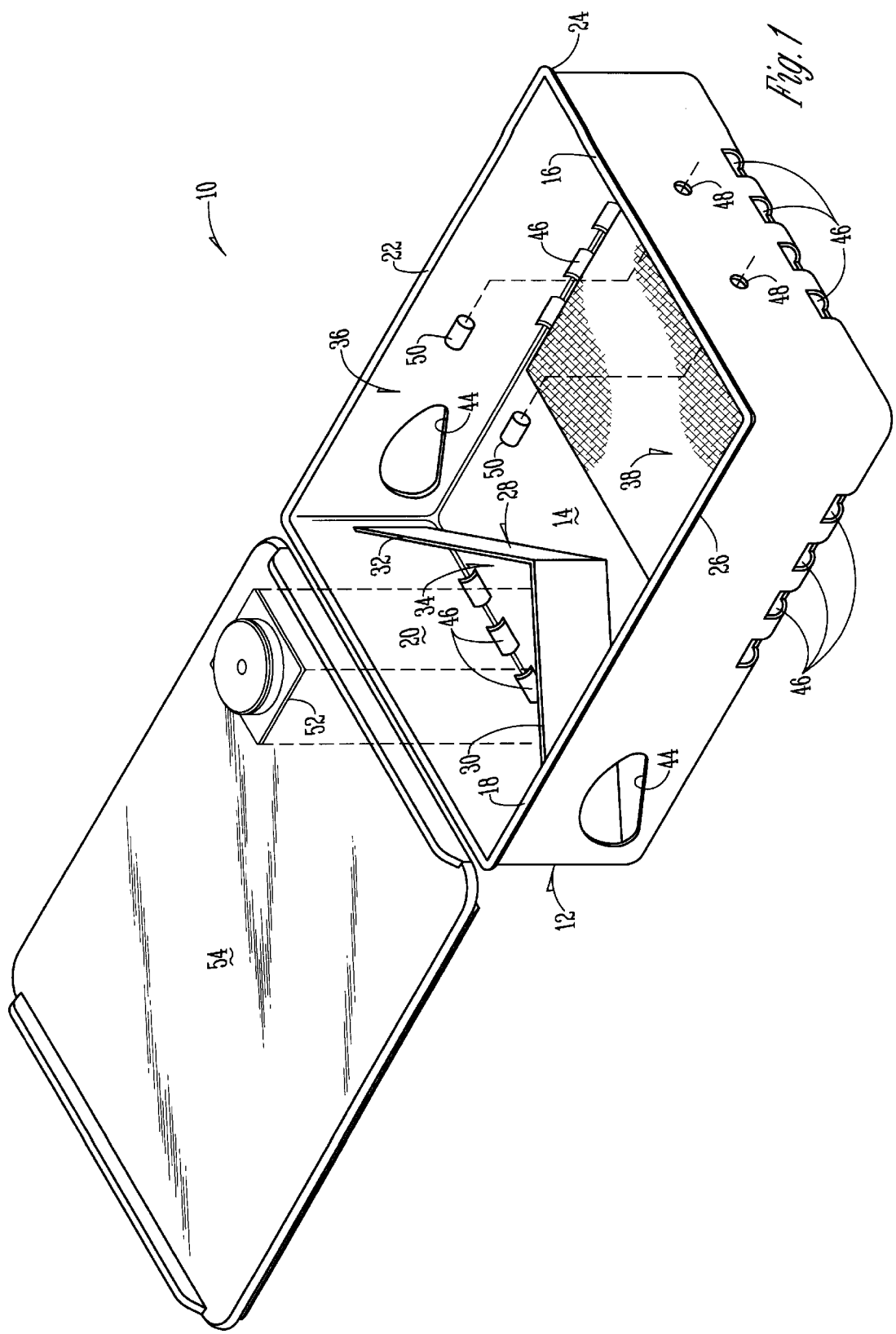
FIG. 1 is a perspective view of the apparatus for trapping and monitoring mice and insects of the present invention.
Figure 2:
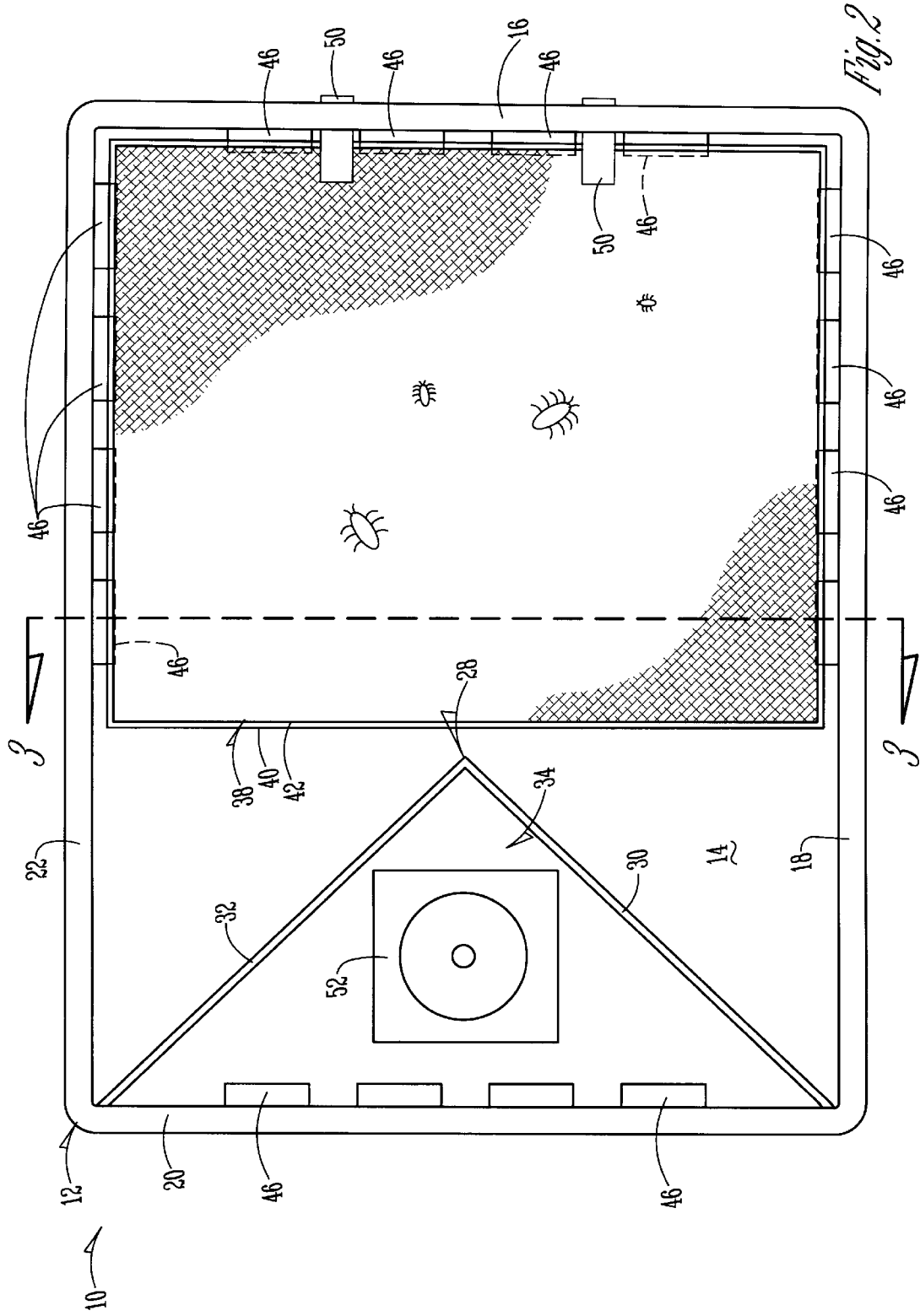
FIG. 2 is a top plan view thereof.

Referring to the drawings, a mouse and insect trap is generally designated by the numeral 10. Trap 10 is formed from a box 12 having a bottom wall 14, and side walls 16, 18, 20 and 22. Side walls 18 and 22 are each provided with laterally extending lip flanges 24, 26.

Within box 12 is a V-shaped partition 28 having two diverging V-legs 30, 32 which divide box 12 into a V-compartment 34 and a glue board compartment 36.

Within glue board compartment 36 is a glue board 38 having a backing 40 (FIG. 3) and an adhesive substance 42 on its upper surface. Glue boards such as glue board 38 are commonly used in the pest control industry. The glue 42 which appears on the upper surface of the glue board grasps the mice or insects which touch it, and holds the mice or insects permanently.

Side walls 18, 22 are also each provided with a mouse hole 44 sized to permit a mouse to enter into the glue board compartment 36. At the lower edges of side walls 16, 18, 20 and 22 are a plurality of insect holes 46 which are substantially smaller than mouse holes 44 so as to prevent a mouse from entering them. However, insect holes 46 are sufficiently large to permit insects to enter into both the glue board compartment 36 and the V-compartment 34.

Side wall 16 includes a pair of pheromone holes 48 which are sized to receive pellets or bullets 50 of pheromone material. These bullets 50 are commonly used in the industry and are made of a pheromone material which attracts both mice and insects.

Within V-compartment 34 is an insect bait 52. Various types of insect baits can be placed in the V-shaped chamber 34, and insects can gain access to the bait through the insect openings 46 in inside wall 20. Any of the commercially available baits may be utilized in V-shaped compartment 34.

Figure 3:
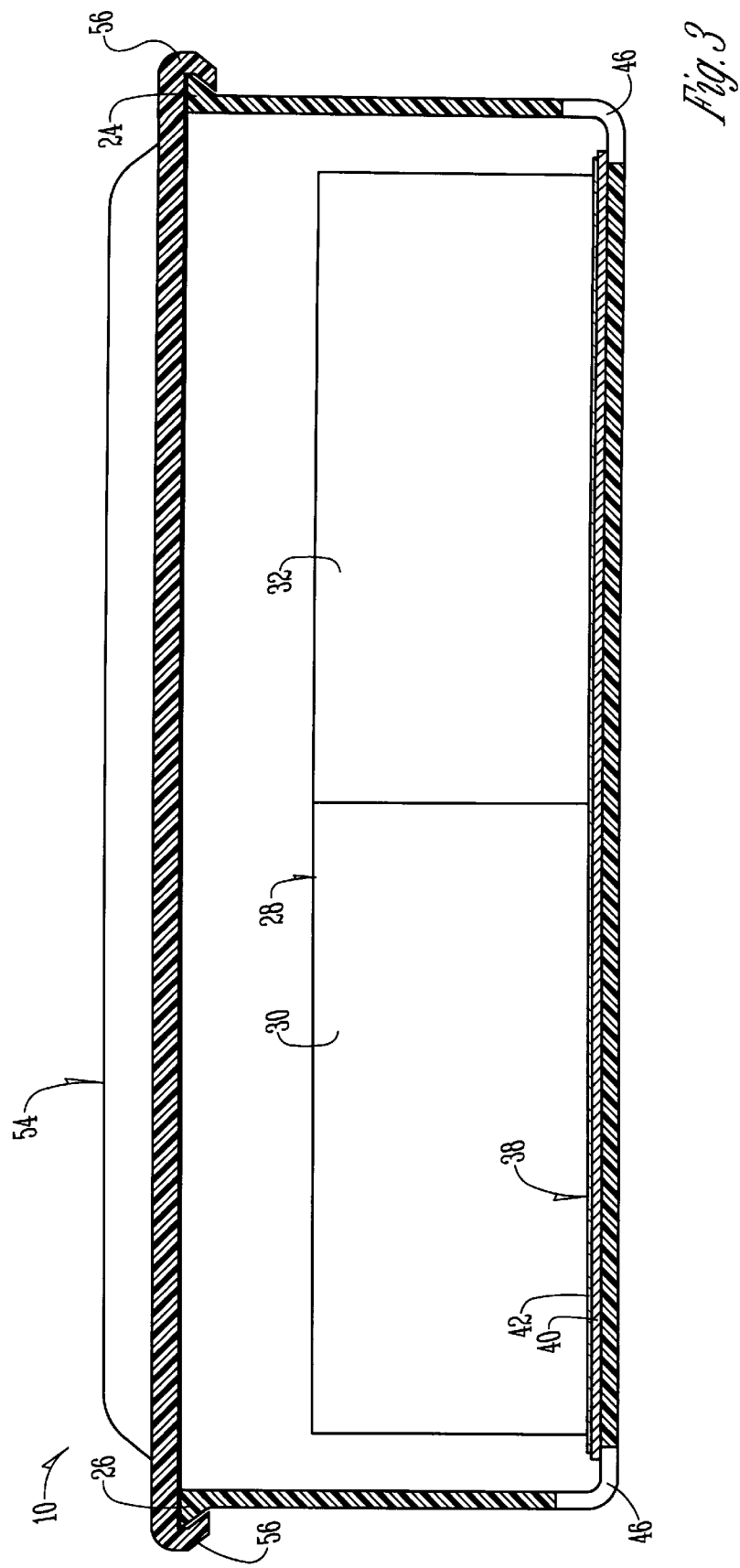
FIG. 3 is a section view taken along line 3—3 of FIG. 2.
Figure 4:
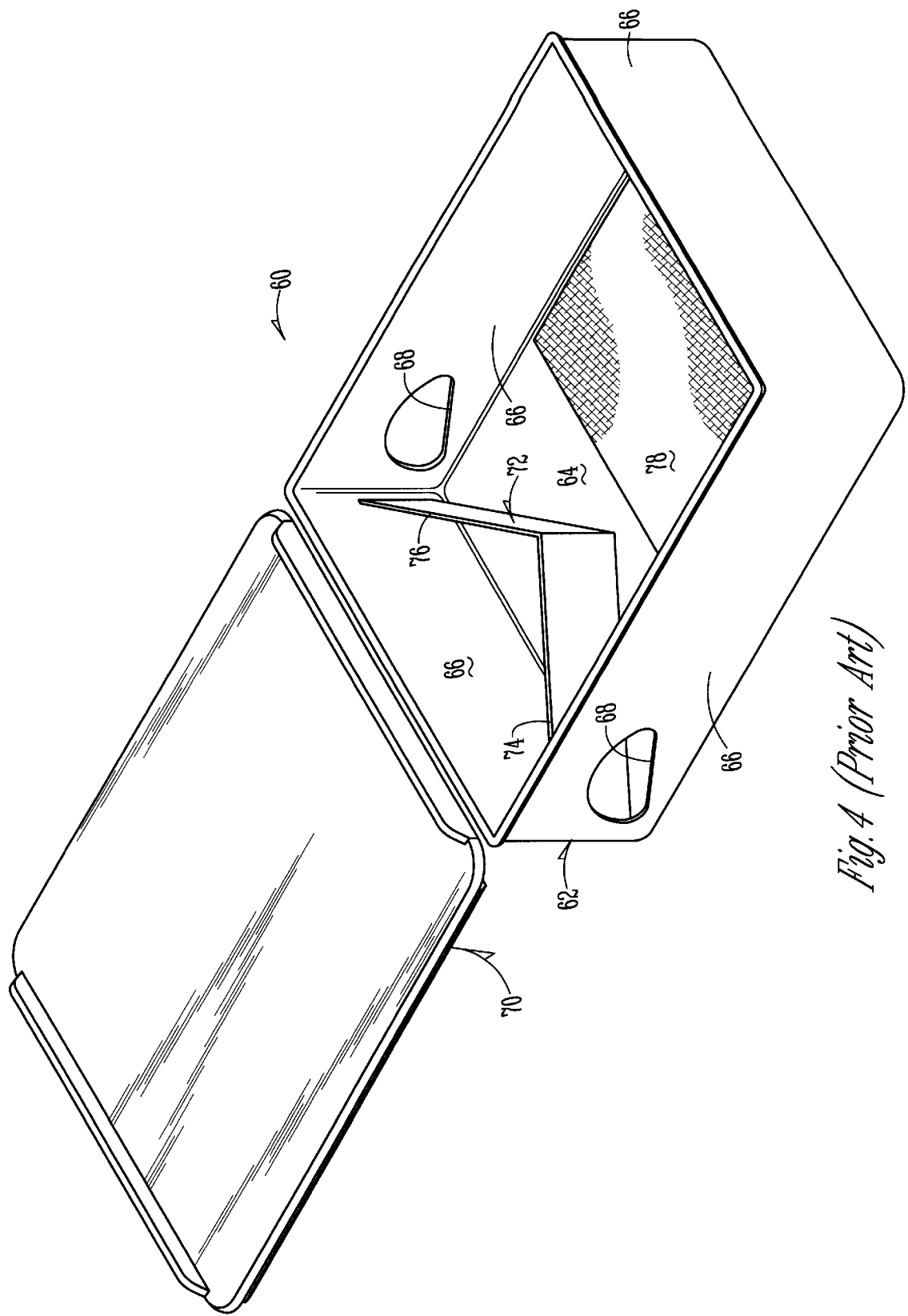
FIG. 4 is a perspective view of a prior art apparatus for trapping mice.

A transparent top wall or lid 54 includes a pair of J-shaped side channels 56 extending along its lateral edges (FIG. 3). These J-shaped channels slide over the outwardly projecting lip flanges 24, 26 to secure the lid 54 in place. Because lid 54 is transparent it is possible to see the contents of the mouse and insect trap 10 at all times.

In operation the trap 10 is placed in an area where mouse and insect problems are believed to be present. Mice are generally attracted by curiosity to the mouse holes 44, and enter the container. The pheromones 50 can also aid in attracting the mice to the interior of the glue board compartment 36. When the mice touch the adhesive material, they become stuck to the glue board and cannot extricate themselves.

The insect openings 46 along the lower edges of side walls 16, 18 and 22 permit insects also to enter the glue board compartment 36. When they touch the glue board they also become attached and are unable to extricate themselves.

The V-shaped compartment 34 provides a different function from the glue board compartment 36. Insects may gain access to the V-shaped compartment 34 through the insect openings 46 in the side wall 20. The insects contact the bait which usually includes some sort of poison. Preferably, the poison is of the type which the insect can carry with it back to its nest. Some insects regurgitate what they have eaten to feed other insects in the nest, thereby causing extermination of other insects within the nest. Others types of poisons can be spread by the insects preening themselves after having touched the poison or bait.

The V-shaped compartment 34 provides an enclosed bait compartment which is not accessible by children, pets or animals. Not even the mice can gain access to the bait within the V-shaped compartment.

The mouse or insect trap of the present invention provides many advantages. The insects which become caught on the glue board provide a good indication of the type and quantity of insects which may be present in the particular area where the trap is set. Thus this trap provides the ability to monitor the particular type of insect which infests a given area. This permits the proper type of bait 52 to be used in the V-shaped compartment 34. That is, the bait can be chosen to be particularly effective against the specific type of insect shown to be present on the glue board. Similarly, other extermination techniques can be specifically adapted to the particular type of insect which is shown to be present. Thus the present trap provides a good monitoring systems for determining the type of insects which are in the area. Similarly it provides means for removing mice. The transparent lid is important because it permits easy monitoring of the trap to determine whether or not mice need to be removed and to determine the particular types of insects which are present. By enclosing the glue board and the bait, the present invention keeps debris and dust off of the board. Most glue boards are used in the open in prior art applications.

While the present invention shows both the V-shaped compartment and the glue board compartment, it is possible to make the present invention containing one or the other or both of these two compartments. For example it is possible to make the invention with only the glue board compartment, or it is possible to make the invention with only a compartment for holding bait. In this latter situation the mouse holes 44 would not be included, and access would only be provided for insects by means of insect holes 46.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A combined mouse and insect trap comprising:
   a container having side walls, a bottom wall, and a top wall forming an enclosed compartment;
   one or more mouse holes in said side walls being sized to permit a mouse to enter through said one or more mouse holes into said compartment;
   one or more insect holes in said side walls being sized too small to permit a mouse to enter said compartment, but being sized to permit insects to enter said compartment;
   one or more diverter panels within said compartment adjacent said mouse holes for diverting a mouse entering said compartment through one of said mouse holes toward said tacky substance, wherein said one or more diverter panels divide said compartment into first and second subcompartments, said mouse holes communicating only with said first subcompartment, a first portion of said insect holes communicating with said first subcompartment, and a second portion of said insect holes communicating with said second subcompartment;
   a tacky substance covering at least a portion of said bottom wall within said compartment, said tacky substance having the property of being able to grip and hold a mouse or an insect whenever said mouse or insect comes into contact with said tacky substance;
   an attractant material within said compartment capable of attracting mice or insects by sense of smell.

2. A combined mouse and insect trap according to claim 1 and further comprising an insect bait within said second subcompartment.

3. A combined mouse and insect trap according to claim 1 and further comprising one or more pheromone mounting holes in said side walls of said container, a pellet of pheromone material mounted within each of said pheromone mounting holes and exposed to the interior of said compartment.

4. A method for trapping mice and for monitoring insects comprising:
   placing a combined mouse and insect trap in an area where trapping of mice and monitoring of insects is desirable, said trap comprising a container having a top wall, side walls, and a bottom wall forming a compartment therein, said side walls having one or more mouse holes therein sized to permit entry of a mouse into said compartment, said side walls also having one or more insect holes therein sized too small for a mouse, but large enough to permit insects to enter said compartment, a glue board being located within said compartment on said bottom wall thereof, and having the characteristics of grasping and holding mice and insects which come into contact therewith;

dividing said compartment into first and second subcompartments with said glue board being in said first subcompartment, placing an insect bait within said second subcompartment, said insect holes providing access to both of said first and second compartments, and said mouse holes providing access only to said first compartment;

monitoring said combined mouse and insect trap periodically to determine what kinds of insects have become entrapped on said glue trap.

* * * * *